(12) United States Patent
Wu et al.

(10) Patent No.: US 11,604,304 B1
(45) Date of Patent: Mar. 14, 2023

(54) IN-SITU CALIBRATION FOR MULTI-COMPONENT SIGNALS

(71) Applicant: Halliburton Energy Services, Inc., Houston, TX (US)

(72) Inventors: Hsu-Hsiang Wu, Houston, TX (US); Yi Jing Fan, Singapore (SG); Li Pan, Singapore (SG); Jin Ma, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 25 days.

(21) Appl. No.: 17/514,797

(22) Filed: Oct. 29, 2021

(51) Int. Cl.
*G01V 13/00* (2006.01)
*G01V 3/20* (2006.01)

(52) U.S. Cl.
CPC ............. *G01V 13/00* (2013.01); *G01V 3/20* (2013.01)

(58) Field of Classification Search
None
See application file for complete search history.

(56) References Cited

U.S. PATENT DOCUMENTS

| 2015/0301222 A1* | 10/2015 | Davydychev | G01V 3/30 |
| | | | 324/338 |
| 2019/0137646 A1* | 5/2019 | Frey | G01V 3/12 |

* cited by examiner

*Primary Examiner* — Douglas X Rodriguez
(74) *Attorney, Agent, or Firm* — Benjamin Ford; C. Tumey Law Group PLLC

(57) ABSTRACT

Systems and methods of the present disclosure relate to calibration of a resistivity tool. A method for in-situ calibration of a resistivity logging tool, comprises transmitting signals with transmitters of the resistivity logging tool; measuring voltages at two or more receivers located at different distances to the transmitters of the resistivity logging tool; decoupling two or more sets of multi-component tensors at two or more receivers based on the measured voltages; calculating a ratio signal from two or more sets of multi-component tensors; obtaining an apparent resistivity based on the ratio signal; simulating a dipole response tensor at the first receiver based on the apparent resistivity; comparing the first set of multi-component tensor with the dipole response tensor to acquire an in-situ calibration factor; and applying the in-situ calibration factor to multi-components for an inversion input.

20 Claims, 13 Drawing Sheets

IN-SITU CALIBRATION FOR MULTI-COMPONENT SIGNALS

BACKGROUND

Air-hang calibration is a conventional way to calibrate electromagnetic measurements of resistivity tools. In resistivity logging while drilling (LWD), raw measurements may need to be calibrated to a dipole response in order for an inversion module to recover surrounding formation resistivity. However, there are many factors that may affect calibration.

For instance, different tool body effects in different formations may affect the calibration. For example, air-hang calibration may not be able to remove tool body effect in all formations. Additionally, different antenna propagation patterns in different formations may also affect the calibration. For example, a tilted angle employed to decouple multi-components in the air may not be accurate in other formations.

Further, different tool effects with different tool face offsets between transmitter and receiver subs may affect the calibration accuracy. This may result in errors in multi-components compared to the dipole response. This effect may also vary with formations and further complicates the calibration. Also, thermal effect may vary in different drilling time periods and may cause DC bias in multi-components of the resistivity tool.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to in-situ calibration of resistivity logging tools. The systems and as described herein may calibrate multi-components of a resistivity logging tool with real-time ratio signals to adaptively correct for tool effect and thermal effect in different formations. It may also save time and effort in determining various errors caused by the various factors mentioned above.

In particular examples, the in-situ calibration process may calibrate downhole absolute measurements based on ratio signals. Although air-hang calibration cannot fully calibrate absolute measurements/signals, the ratio signals after the calibration may be calibrated accurately. Therefore, the techniques described herein acquire resistivity determination from a ratio signal first.

Then, real-time in-situ modeling calculations may be performed based on the resistivity determination from the ratio signal, and then resistivity profiles may be used to estimate the absolute modeling responses. Finally, by comparing the absolute modeling responses against the absolute measurements, the residual calibration factor to the absolute measurements may be determined. The in-situ calibration process may improve the accuracy of absolute multi-component signals that are used to determine a distance-to-bed-boundary (DTBB) inversion.

Additionally, the calibration may occur in real-time, and usage of real-time measurements to generate ratio-signals for in-situ calibration may render any extra measurement unnecessary as the ratio-signals by themselves are sufficient for the in-situ calibration. The ratio signals may assist in removing all tool effects and thermal effects in different formations. In some examples, a sliding window method may be implemented to trigger in-situ calibration at only some of the logging points in order to reduce time and cost for real-time in-situ calibration.

Figure 1:
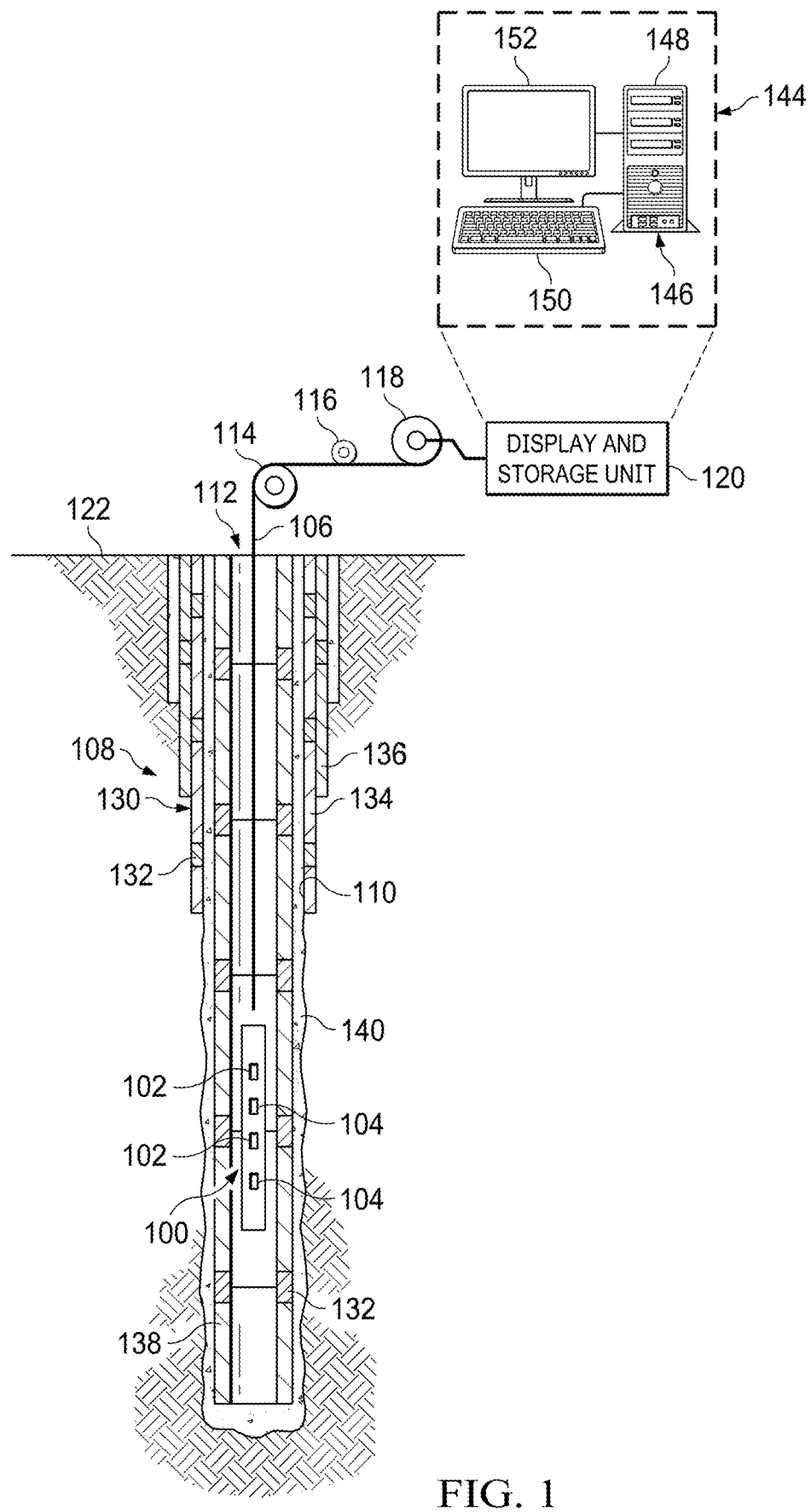
FIG. 1 illustrates a resistivity tool in a wireline configuration, in accordance with examples of the present disclosure.

FIG. 1 illustrates an operating environment for a resistivity tool 100, in accordance with examples of the present disclosure. It should be noted that while FIG. 1 generally depicts a land-based operation, those skilled in the art may recognize that the principles described herein are equally applicable to subsea operations that employ floating or sea-based platforms and rigs, without departing from the scope of the disclosure.

As illustrated, the resistivity tool 100 may include at least one transmitter 102 and at least one receiver 104. Any suitable transmitter and receiver may be employed. The transmitters 102 and the receivers 104 may be disposed along the resistivity tool 100 in any suitable configuration. The resistivity tool 100 may be operatively coupled to a conveyance 106 (e.g., wireline, slickline, coiled tubing, pipe, downhole tractor, and/or the like) which may provide mechanical suspension, as well as electrical connectivity, for the resistivity tool 100. It should be understood that the configuration of resistivity tool 100 shown on FIG. 1 is merely illustrative and other configurations of the resistivity tool 100 may be used with the present techniques.

A conveyance 106 and the resistivity tool 100 may extend within a casing string 108 to a desired depth within the wellbore 110. The conveyance 106, which may include one or more electrical conductors, may exit a wellhead 112, may pass around a pulley 114, may engage an odometer 116, and may be reeled onto a winch 118, which may be employed to raise and lower the resistivity tool 100 in the wellbore 110. Signals recorded by the resistivity tool 100 may be stored on memory and then processed by a display and storage unit 120 after recovery of the resistivity tool 100 from the wellbore 110. Alternatively, signals recorded by the resistivity tool 100 may be transmitted to the display and storage unit 120 by way of the conveyance 106. The display and storage unit 120 may process the signals, and the information contained therein may be displayed for an operator to observe and store for future processing and reference. Alternatively, the signals may be processed downhole prior to receipt by display and storage unit 120 or both downhole and at a surface 122, for example. The display and storage unit 120 may also contain an apparatus for supplying control signals and power to the resistivity tool 100. The casing string 108 may extend from the wellhead 112 at or above ground level to a selected depth within the wellbore 110. The casing string 108 may comprise a plurality of joints 130 or segments of the casing string 108, each joint 130 being connected to the adjacent segments by a collar 132. There may be any number of layers in the casing string 108. For example, the layers may include a first casing 134 and a second casing 136.

FIG. 1 also illustrates a pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. The resistivity tool 100 may be dimensioned so that it may be lowered into the wellbore 110 through the pipe string 138, thus avoiding the difficulty and expense associated with pulling pipe string 138 out of wellbore 110. In examples, cement 140 may be disposed on the outside of pipe string 138. Cement 140 may further be disposed between pipe string 138 and casing string 108. It should be noted that cement 140 may be disposed between any number of casings, for example between the first casing 134 and the second casing 136.

In logging systems utilizing the resistivity tool 100, a digital telemetry system may be employed, wherein an electrical circuit may be used to both supply power to the resistivity tool 100 and to transfer data between the display and storage unit 120 and the resistivity tool 100. A DC voltage may be provided to the resistivity tool 100 by a power supply located above ground level, and data may be coupled to the DC power conductor by a baseband current pulse system. Alternatively, the resistivity tool 100 may be powered by batteries located within the downhole tool assembly, and/or the data provided by the resistivity tool 100 may be stored within the downhole tool assembly, rather than transmitted to the surface during logging.

In certain examples, operation and function of the resistivity tool 100 may be controlled at the surface 122 by a computer 144. As illustrated, the computer 144 may be a component of the display and storage unit 120. The computer 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the computer 144 may be a personal computer, a network storage device, or any other suitable device and may vary in size, shape, performance, functionality, and price. The computer 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. The non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. At the surface 122, the computer 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with the resistivity tool 100 and/or software executed by processing unit 146. For example, the computer 144 may enable an operator to select analysis options, view collected log data, view analysis results, and/or perform other tasks. In examples, the resistivity tool 100 and the computer 144 may be utilized to measure and process properties (e.g., signals) of a downhole environment.

Figure 2:
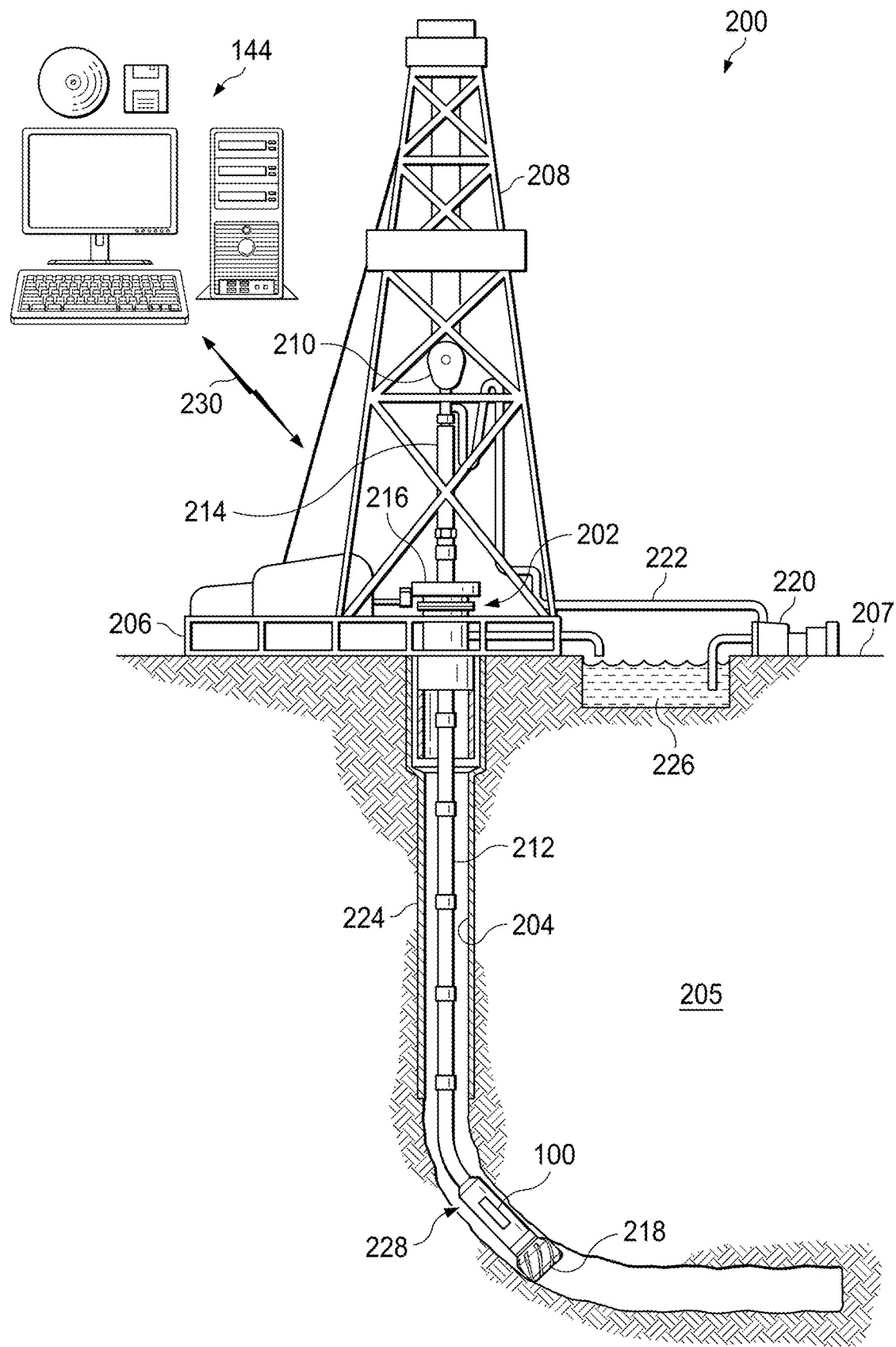
FIG. 2 illustrates a resistivity tool in a drilling configuration, in accordance with examples of the present disclosure.

FIG. 2 illustrates an example of the resistivity tool 100 included in a drilling system 200, in accordance with examples of the present disclosure. It should be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a borehole 204 may extend from a wellhead 202 into a subterranean formation 205 from a surface 207. The borehole 204 may include horizontal, vertical, slanted, curved, and other types of borehole geometries and orientations. A drilling platform 206 may support a derrick 208 having a traveling block 210 for raising and lowering a drill string 212. The drill string 212 may include, but is not limited to, drill pipe and coiled tubing, as generally known to those skilled in the art. A top drive or kelly 214 may support the drill string 212 as it may be lowered through a rotary table 216.

A drill bit 218 may be attached to the distal end of drill string 212 and may be driven either by a downhole motor and/or via rotation of drill string 212 from the surface 207. Without limitation, the drill bit 218 may include roller cone bits, PDC bits, natural diamond bits, any hole openers, reamers, coring bits, and the like. As the drill bit 218 rotates, it may create and extend borehole 204 that penetrates the subterranean formation 205. A pump 220 may circulate drilling fluid through a feed pipe 222 to the kelly 214, downhole through the interior of the drill string 212, through orifices in the drill bit 218, back to the surface 207 via an annulus 224 surrounding the drill string 212, and into a retention pit 226.

The drill string 212 may begin at wellhead 202 and may traverse borehole 204. The drill bit 218 may be attached to a distal end of the drill string 212 and may be driven, for example, either by a downhole motor and/or via rotation of the drill string 212 from the surface 207. The drill bit 218 may be a part of a bottom hole assembly 228 at a distal end of the drill string 212. The bottom hole assembly 228 may include the resistivity tool 100 via threaded connections, for example. As will be appreciated by those of ordinary skill in the art, bottom hole assembly 228 may be a measurement-while drilling (MWD) or logging-while-drilling (LWD) system.

Without limitation, the resistivity tool 100 may be connected to and/or controlled by the computer 144. Processing of information recorded may occur downhole and/or at the surface 207. Data being processed downhole may be transmitted to the surface 207 to be recorded, observed, and/or further analyzed. Additionally, the data may be stored in memory of the resistivity tool 100 while the resistivity tool 100 is disposed downhole.

In some examples, wireless communication may be used to transmit information back and forth between the computer 144 and the resistivity tool 100. The computer 144 may transmit information to the resistivity tool 100 and may receive, as well as process information recorded by the resistivity tool 100. In examples, while not illustrated, the bottom hole assembly 228 may include one or more additional components, such as an analog-to-digital converter, filter and amplifier, among others, that may be used to process the measurements of the resistivity tool 100 before they may be transmitted to the surface 207. Alternatively, raw measurements may be transmitted to the surface 207 from the resistivity tool 100.

Any suitable technique may be used for transmitting signals from the resistivity tool 100 to the surface 207, including, but not limited to, wired pipe telemetry, mud-pulse telemetry, acoustic telemetry, and electromagnetic telemetry. While not illustrated, the bottom hole assembly 228 may include a telemetry subassembly that may transmit telemetry data to the surface 207. Without limitation, an electromagnetic source in the telemetry subassembly may be operable to generate pressure pulses in the drilling fluid that propagate along the fluid stream to the surface 207. At the surface 207, pressure transducers (not shown) may convert the pressure signal into electrical signals for a digitizer (not illustrated). The digitizer may supply a digital form of the telemetry signals to the computer 144 via a communication link 230, which may be a wired or wireless link. The telemetry data may be analyzed and processed by the computer 144. The computer 144 may be employed for orientation determination and calibration of the resistivity tool 100.

Figure 3:
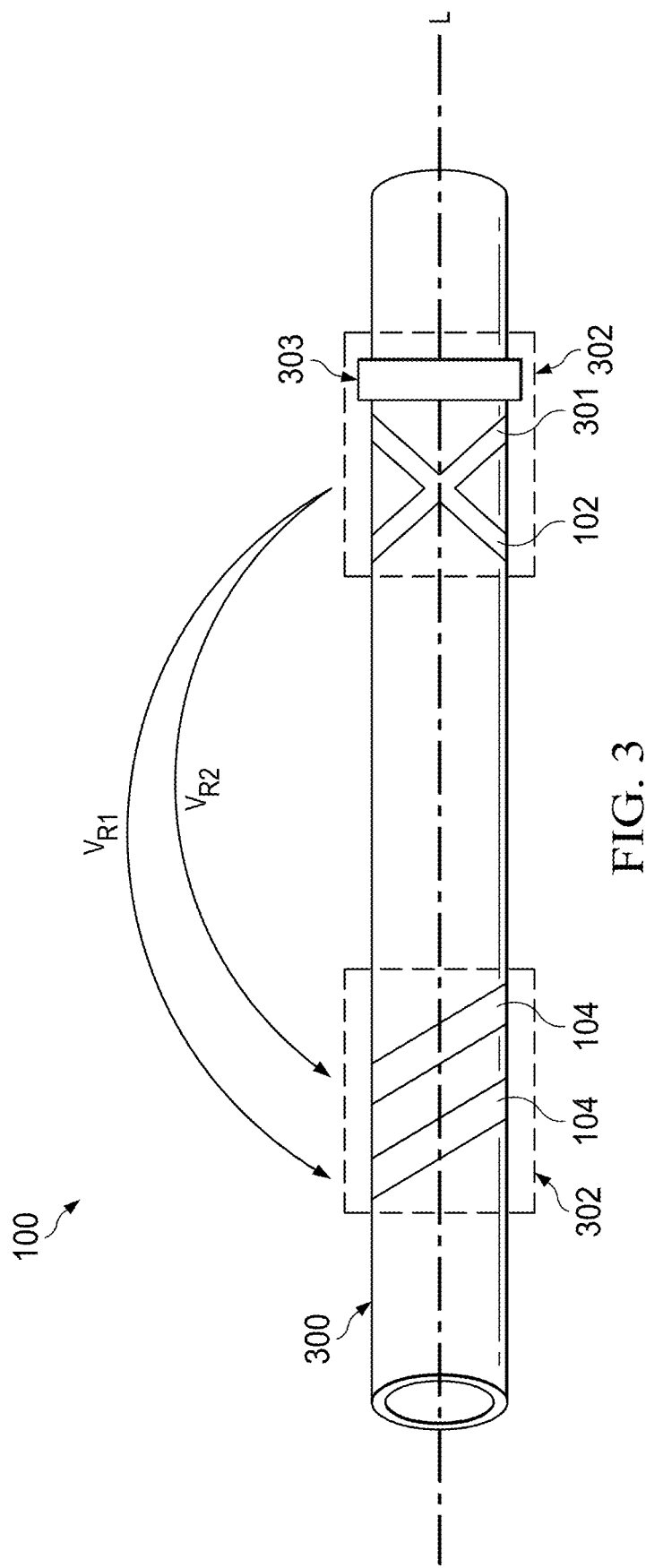
FIG. 3 illustrates a close-up view of an exemplary configuration of the resistivity tool, in accordance with examples of the present disclosure.
Figure 4A:
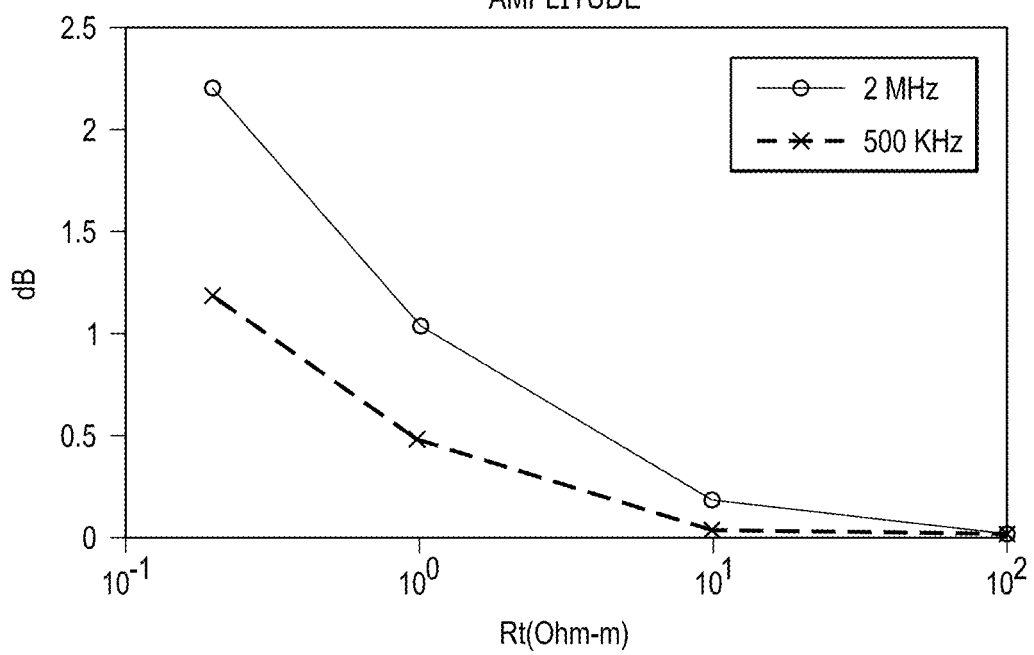
FIGS. 4A-4D illustrate residual errors in multi-components in different formations after an air-hang calibration, in accordance with examples of the present disclosure.
Figure 4B:
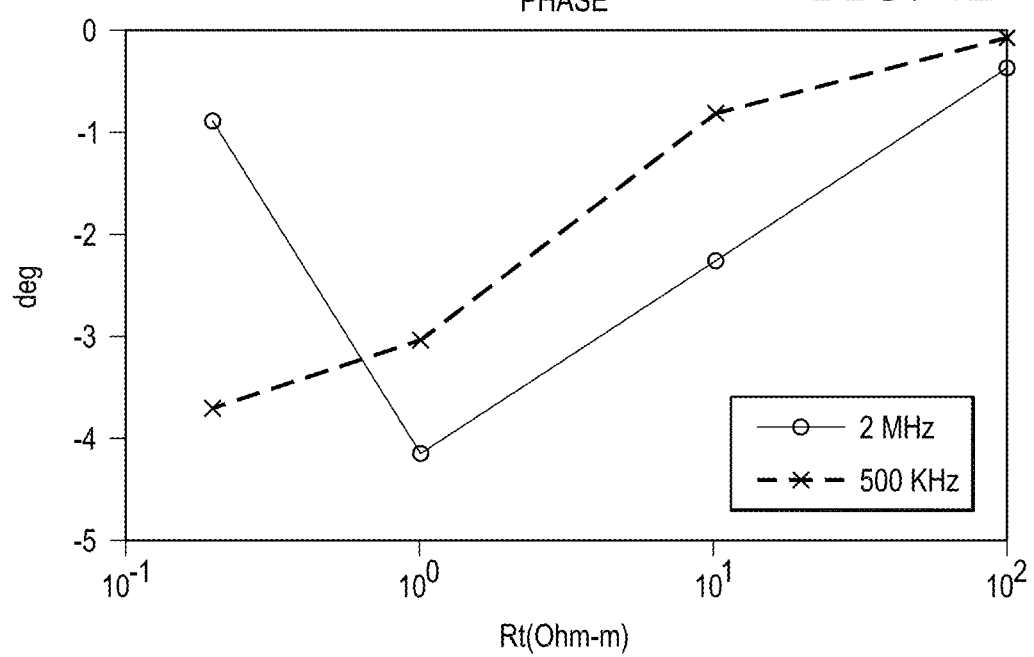
Figure 4C:
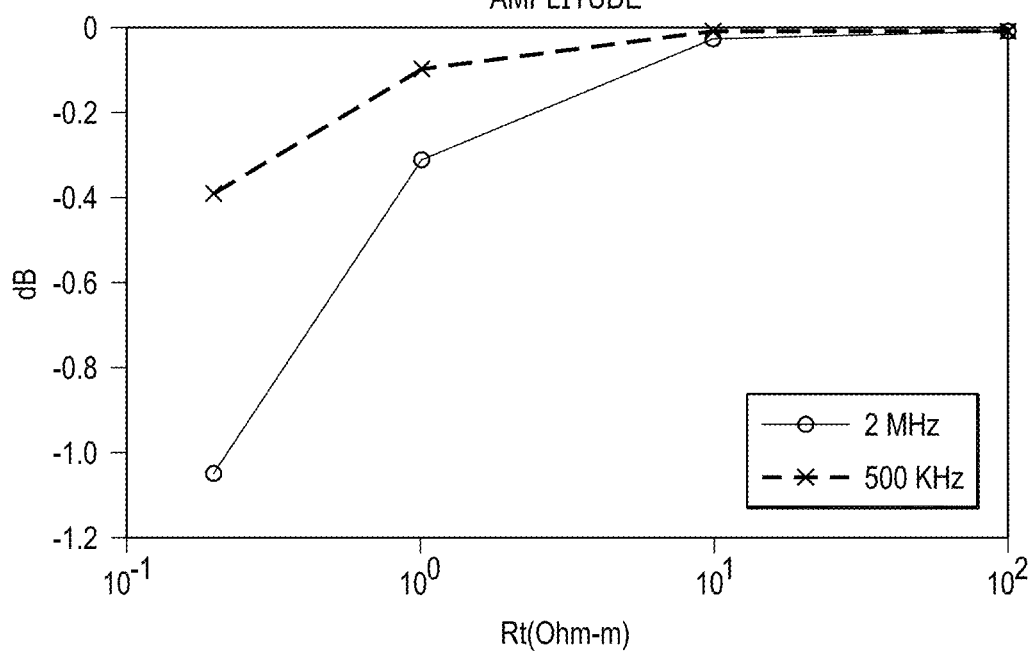
Figure 4D:
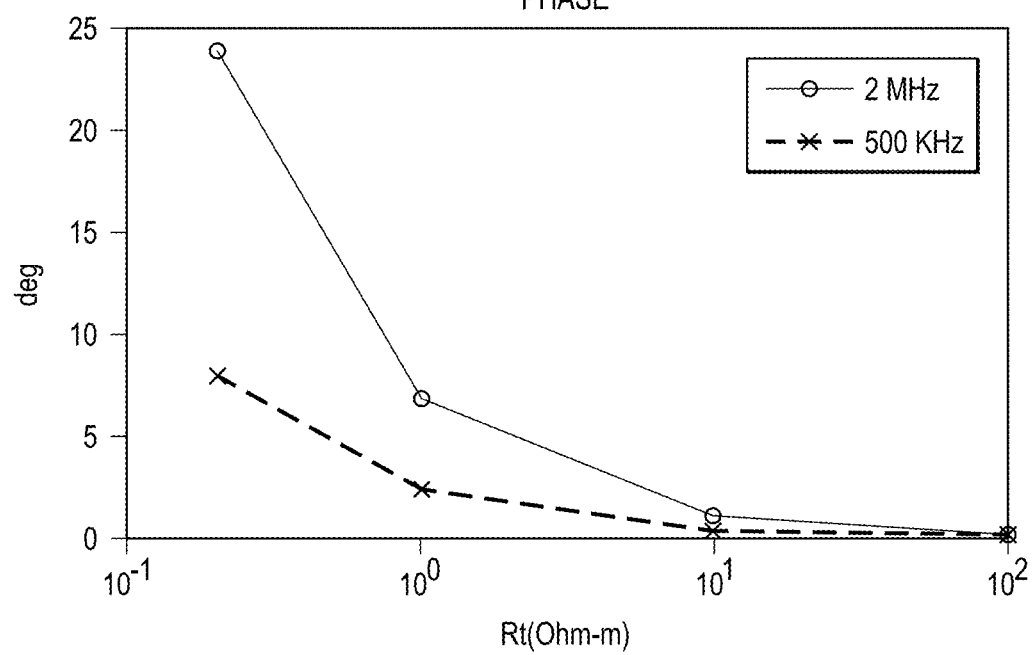
Figure 5A:
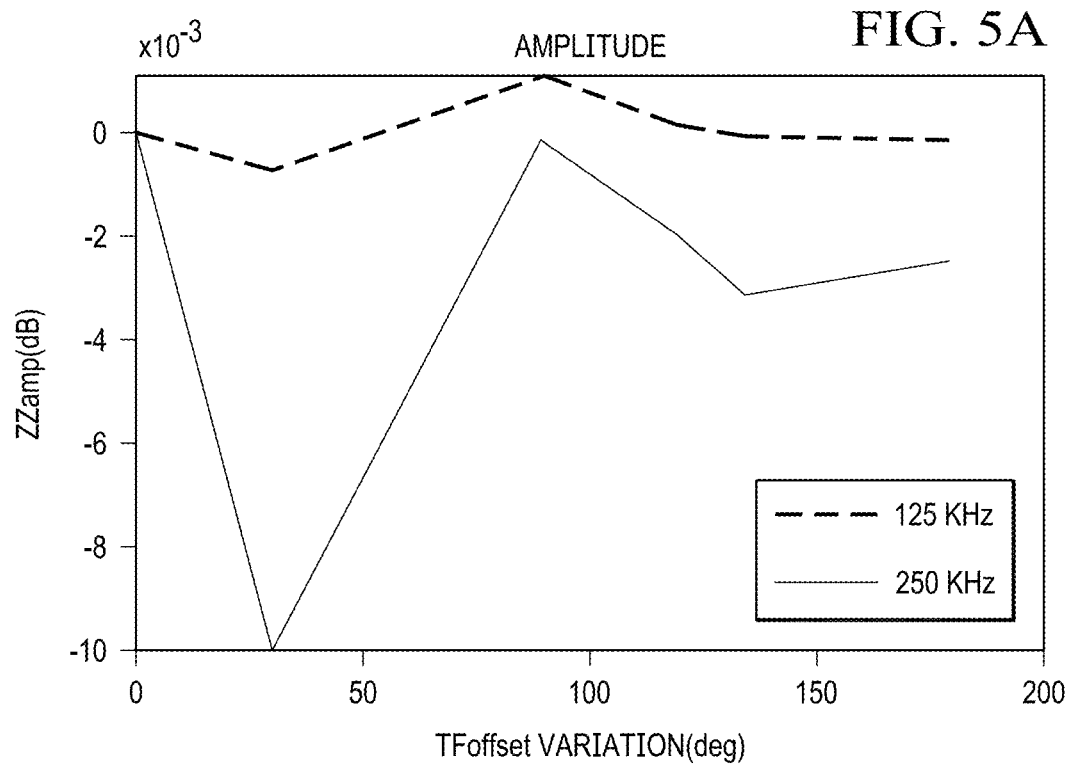
FIGS. 5A-5D illustrate residual errors in multi-components with different tool face offset angles between transmitter and receivers, in accordance with examples of the present disclosure.
Figure 5B:
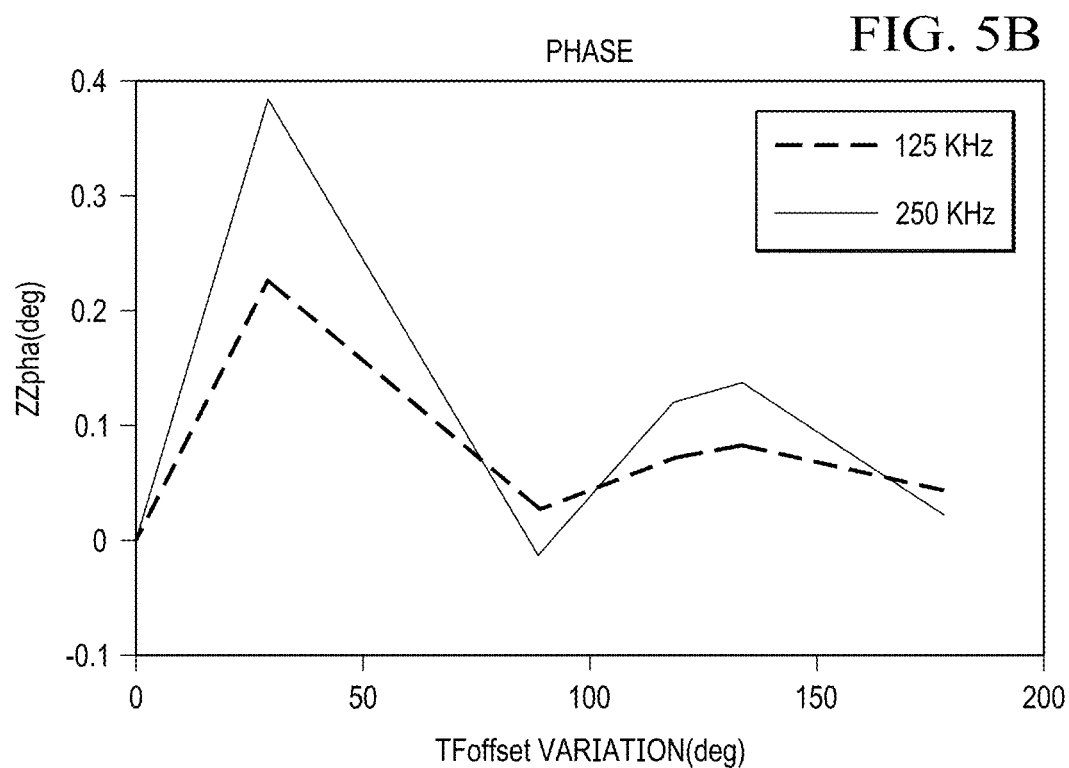
Figure 5C:
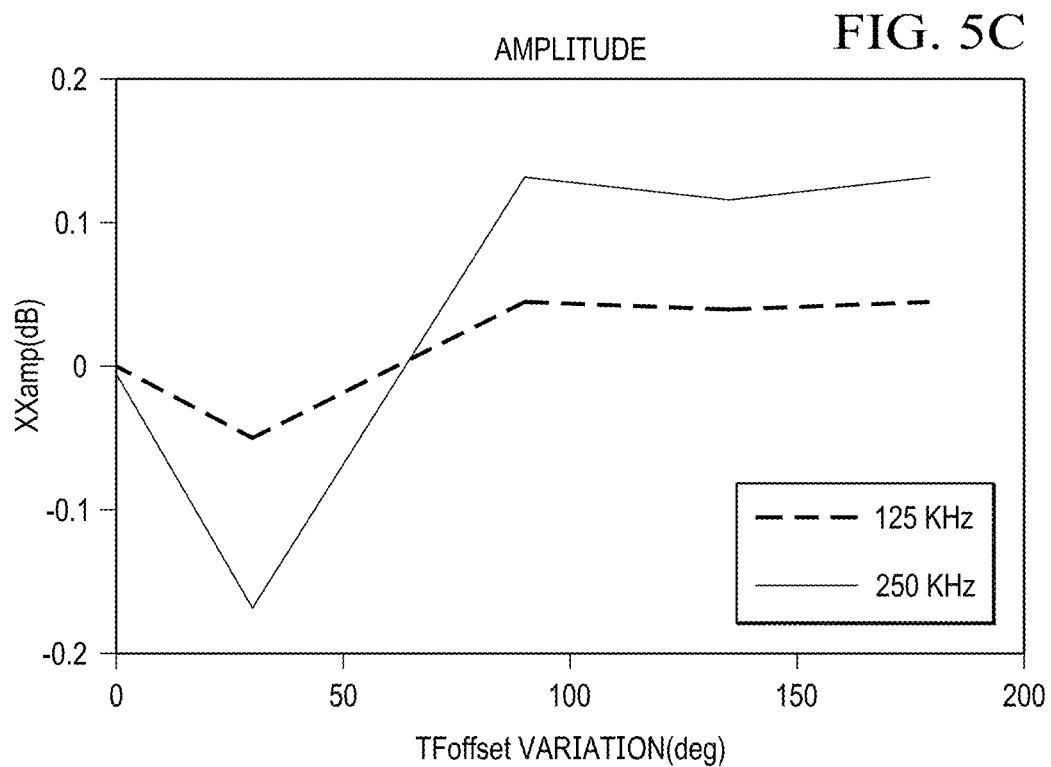
Figure 5D:
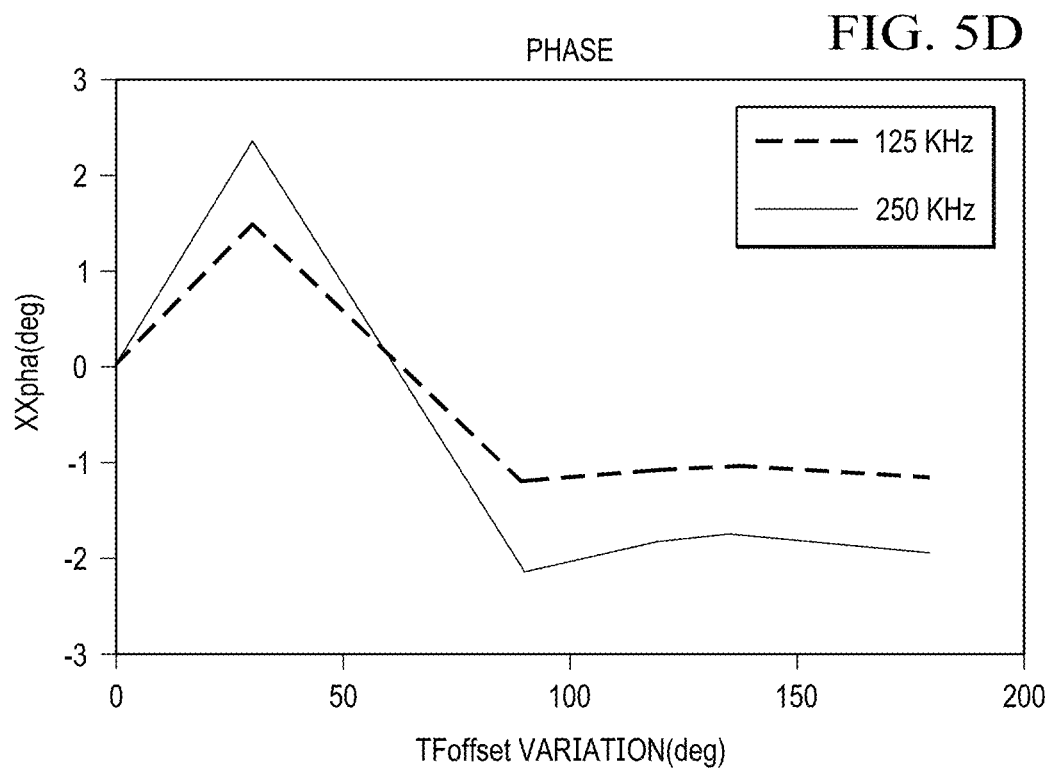

FIG. 3 illustrates a close-up view of an exemplary configuration of the resistivity tool 100, in accordance with some examples of the present disclosure. The resistivity tool 100 may include the transmitters 102 and the receivers 104. In some examples, the resistivity tool 100 may include coaxial and/or collocated transmitters 102 (e.g., intersecting loops) and two tilted receivers 104. The receivers 104 may be tilted relative (e.g., 45 degrees) to a longitudinal axis L of the resistivity tool 100.

A tool body 300 (e.g., collar), antenna ferrite/shields 302, and thermal effect may affect raw voltage measurements. A typical calibration method may acquire measurements in the air (air hang calibration) and may calibrate raw components with components acquired during the air hang. The tool effect and thermal effect may be the same in the air and in the formation. However, the tool effect and thermal effect may not be the same for different formations. Hence, there is still residual error in multi-components after the air-hang calibration. The residual errors may vary with formation resistivity and frequencies. Voltage received at the two receivers, $V_{R1}$, $V_{R2}$, may both contain tool effect and thermal effect. The tool 100 may also include a collocated transmitter 301 and/or a coaxial transmitter 303.

FIGS. 4A-4D illustrate residual errors in multi-components in different formations after an air-hang calibration for different frequencies, in accordance with examples of the present disclosure. A tool model similar to FIG. 3 with the tool collar and antenna structures may be modeled in commercial software with different formation resistivity.

The measurements may be calibrated by the response in air. Decoupled and calibrated multi-components may be compared with dipole response (e.g., modeled with a code). As illustrated, there are residual errors for different components. The residual errors are varying with formation resistivity and frequencies.

FIGS. 5A-5D illustrate residual errors in multi-components with different tool face offset angles (e.g., TFoffset variations) between transmitter and receivers for different frequencies, in accordance with examples of the present disclosure. In some examples, a tool with longer spacing and lower frequencies may be modeled in software with different tool face offset angles between transmitter and receivers. Residual errors in multi-components may vary with both tool face offset angles and formation resistivity. Modeling studies and lab tests also show that residual errors are also varying with antenna tilted angle and thermal effect. The residual errors may be caused by different factors. These effects may also be intermingled. It may be complicated to analyze and correct the residual errors for each factor. In addition, the residual error obtained from modeling and empirical data may not be accurate for different tools and drilling conditions.

Referring back to FIG. 3, as previously noted, the voltage received at two receivers $V_{R1}$, $V_{R2}$ may both contain tool effect and thermal effect. In some examples, the effects are similar for these two measurements because of their close proximity to each other.

A ratio signal $$\left(\frac{V_{R1}}{V_{R2}}\right)$$

may remove most of the tool effect and thermal effect. This ratio signal may be used to obtain an apparent resistivity without residual error. An ideal signal may be obtained by simulating a dipole response with this apparent resistivity. Comparing the measurement with this ideal signal may assist in determining the residual error (e.g., the in-situ calibration factor) in multi-components. Then, the in-situ calibration factor may be employed to correct the multi-components for an inversion input. This method may remove all residual errors caused by various factors in real-time and is applicable to different tools, formations, and drilling conditions. In addition, some examples may include a sliding window technique to trigger in-situ calibration at only some of the logging points in order to reduce time and cost.

Figure 6A:
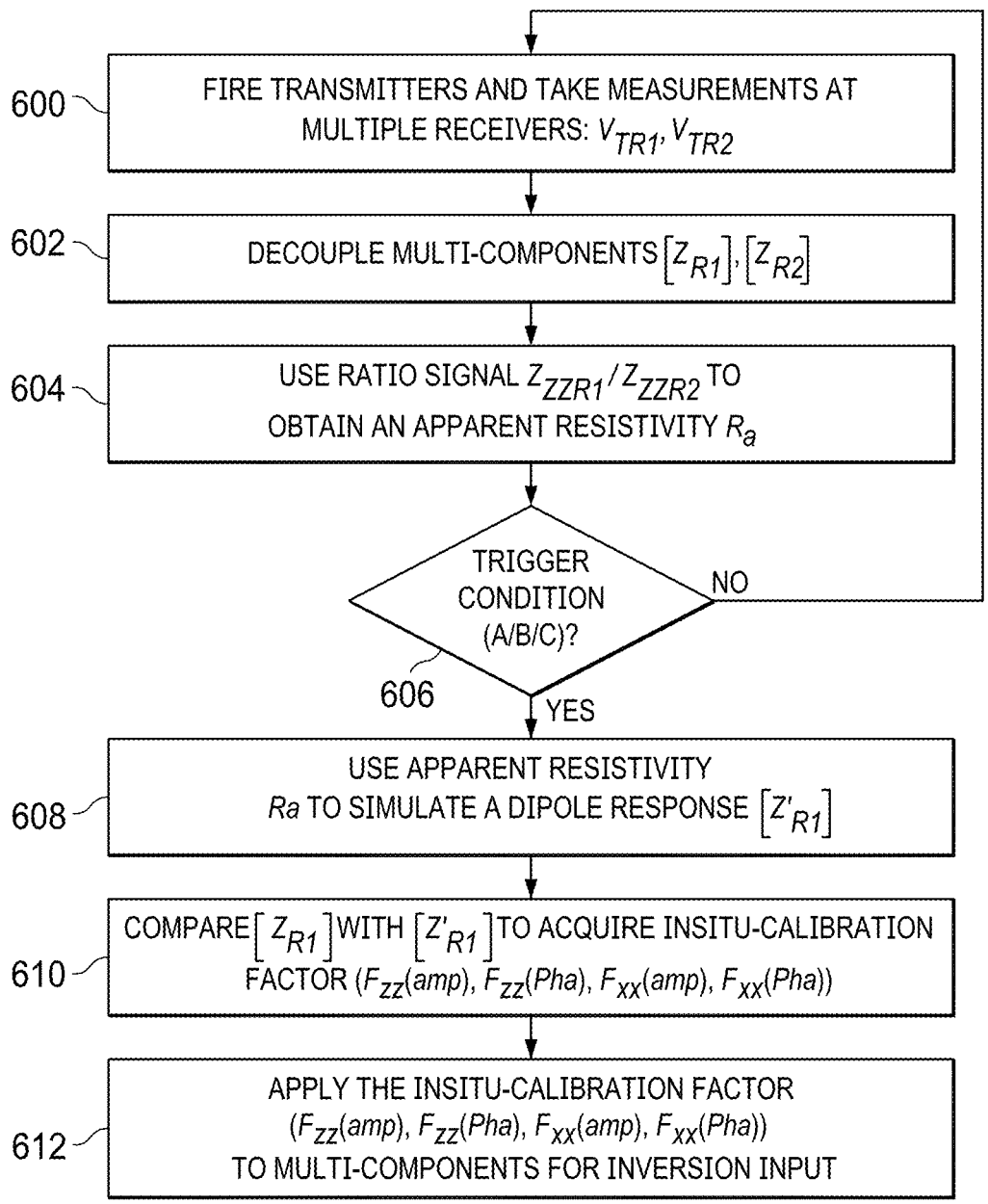
FIG. 6A illustrates a workflow for employing a ratio signal for in-situ calibration of a resistivity tool, in accordance with examples of the present disclosure.

FIG. 6A illustrates a workflow for employing a ratio signal for in-situ calibration of a resistivity tool, in accordance with examples of the present disclosure. At step 600, two collocated transmitters may be separately fired (e.g., transmission of signals) and voltage at two receivers ($V_{TR1}$, $V_{TR2}$), may be measured. At step 602, decoupling of a multi-component tensor, $[Z_{R1}]$, $[Z_{R2}]$, may occur via Equations 1 to 3:

$$[Z_{R1}] = \begin{bmatrix} Z_{zzR1} & & Z_{xzR1} \\ & Z_{yyR1} & \\ Z_{zxR1} & & Z_{zzR1} \end{bmatrix} \quad \text{Eq. (1)}$$

$$[Z_{R1}] = \begin{bmatrix} Z_{zzR2} & & Z_{xzR2} \\ & Z_{yyR2} & \\ Z_{zxR2} & & Z_{zzR2} \end{bmatrix} \quad \text{Eq. (2)}$$

-continued $$Z_R(\beta') = \begin{bmatrix} \sin\theta_t\cos\beta' \\ \sin\theta_t\sin\beta' \\ \cos\theta_t \end{bmatrix}^T \begin{bmatrix} Z_{xx} & 0 & Z_{zx} \\ 0 & Z_{yy} & 0 \\ Z_{xz} & 0 & Z_{zz} \end{bmatrix} \begin{bmatrix} \sin\theta_r\cos(\beta' + \beta_{ref}) \\ \sin\theta_r\sin(\beta' + \beta_{ref}) \\ \cos\theta_r \end{bmatrix}$$ Eq. (3)

where $Z_R(\beta')$ is the voltage normalized by the transmitter current. $\theta_t$ and $\theta_r$ are tilted angles of the transmitter and receiver. $\beta'$ is the tool face of transmitter. $\beta_{ref}$ is the tool face offset between receiver and transmitter.

Figure 6B:
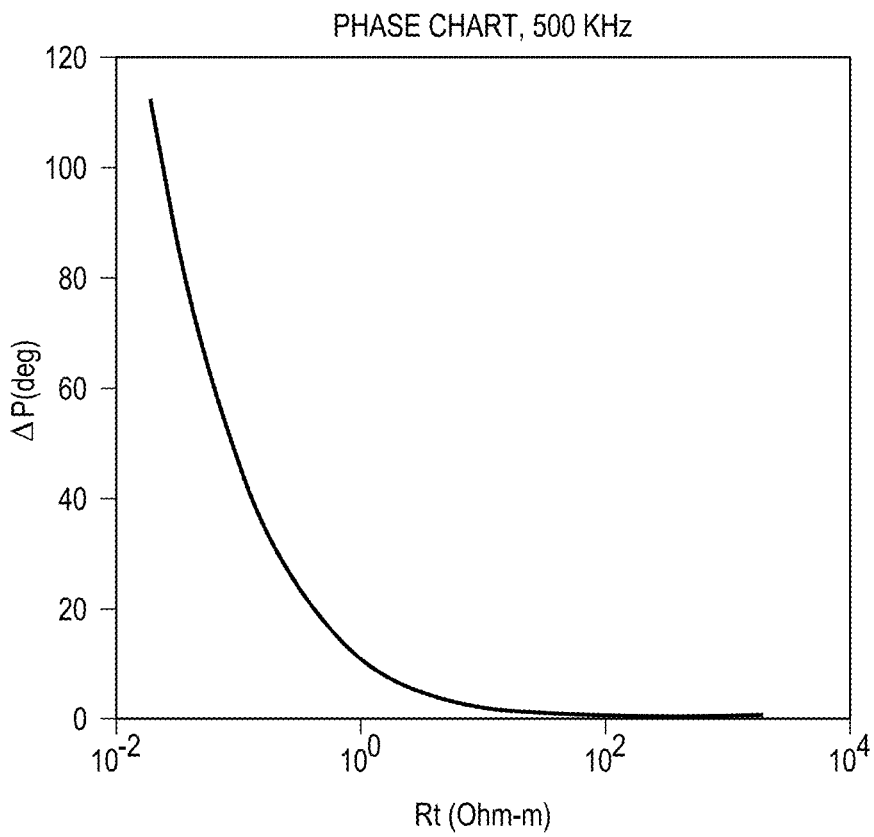
FIGS. 6B and 6C illustrate look-up tables for determining apparent resistivity, in accordance with examples of the present disclosure.
Figure 6C:
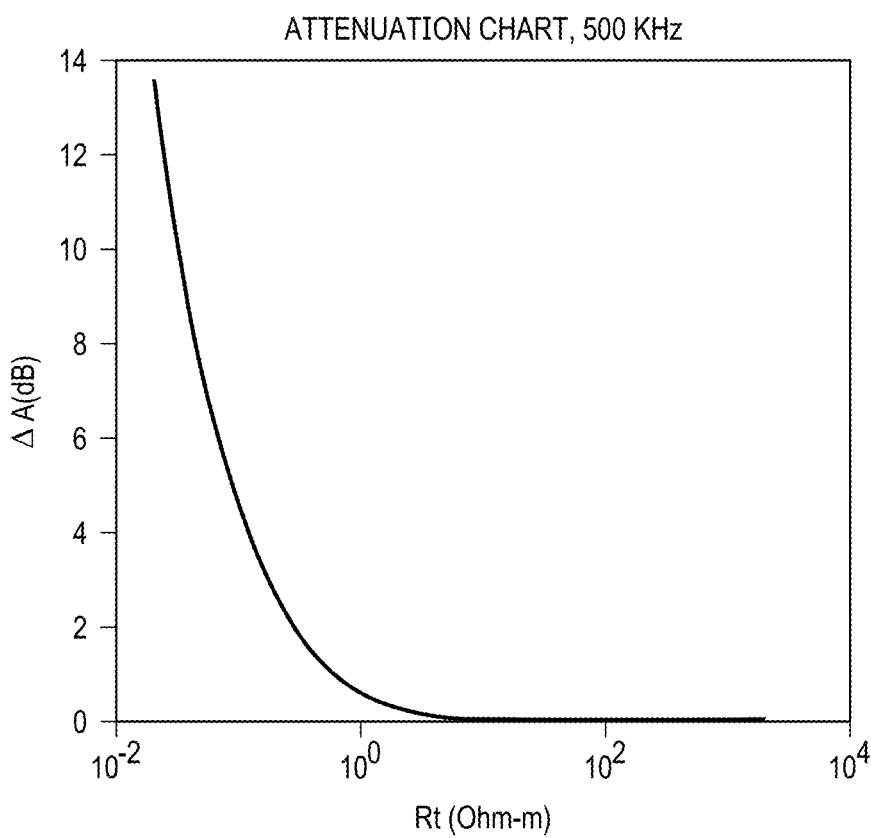

At step 604, a ratio signal $$\frac{Z_{zzR1}}{Z_{zzR2}}$$

may be used to main an apparent resistivity $R_a$. In some examples, this step may be achieved by using an inversion method or a look-up table approach as shown on FIGS. 6B and 6C. For example, the x-axis is the apparent resistivity, the y-axis is the phase/amplitude of the ratio signal. The apparent resistivity may be determined (e.g., looked-up) using the ratio signal from FIGS. 6B and 6C.

At step 606, use of a Condition A, a Condition B, or a Condition C, or a combination of at least two of the Conditions to trigger/initiate an in-situ calibration.

The Condition A may include a distance L away from the last calibrated measured depth: $\Delta MD = MD - MD_{lastCal} > L$. The Condition B may include a change in apparent resistivity that is larger than percentage Pr:

$$\frac{R_a - R_{a_{lastCal}}}{R_{a_{lastCal}}} * 100 > P_r.$$

The Condition C may include a change in temperature is larger than percentage Pt:

$$\frac{T - T_{lastCal}}{T_{lastCal}} * 100 > P_t.$$

At step 608, the apparent resistivity $R_a$ may be utilized to simulate a dipole response tensor $[Z_{R1}']$. At step 610, $[Z_{R1}']$ and $[Z_{R1}]$ may be compared to acquire an in-situ calibration factor ($F_{zz}$(amp), $F_{zz}$(Pha), $F_{xx}$(amp), $F_{xx}$(Pha)).

At step 612, the in-situ calibration factor ($F_{zz}$(amp), $F_{zz}$(Pha) $F_{xx}$(amp), $F_{xx}$(Pha)) may be applied to multi-components for an inversion input for the calibration of the resistivity tool. Exemplary calibration Equations 4 to 13 are shown below:

$$\text{Amp}(Z_{xxR}) = \text{Amp}(Z_{xxR}) - F_{xx}(\text{amp})$$ Eq. (4)

$$\text{Amp}(Z_{yyR}) = \text{Amp}(Z_{yyR}) - F_{xx}(\text{amp})$$ Eq. (5)

$$\text{Amp}(Z_{zzR}) = \text{Amp}(Z_{zzR}) - F_{zz}(\text{amp})$$ Eq. (6)

$$\text{Amp}(Z_{xzR}) = \text{Amp}(Z_{xzR}) - (F_{xx}(\text{amp}) + F_{zz}(\text{amp}))/2$$ Eq. (7)

$$\text{Amp}(Z_{zxR}) = \text{Amp}(Z_{zxR}) - (F_{xx}(\text{amp}) + F_{zz}(\text{amp}))/2$$ Eq. (8)

$$\text{Pha}(Z_{xxR}) = \text{Pha}(Z_{xxR}) - F_{xx}(\text{pha})$$ Eq. (9)

$$\text{Pha}(Z_{yyR}) = \text{Pha}(Z_{yyR}) - F_{xx}(\text{pha})$$ Eq. (10)

$$\text{Pha}(Z_{zzR}) = \text{Pha}(Z_{zzR}) - F_{zz}(\text{pha})$$ Eq. (11)

$$\text{Pha}(Z_{xzR}) = \text{Pha}(Z_{xzR}) - (F_{xx}(\text{amp}) + F_{zz}(\text{pha}))/2$$ Eq. (12)

$$\text{Pha}(Z_{zxR}) = \text{Pha}(Z_{zxR}) - (F_{xx}(\text{amp}) + F_{zz}(\text{pha}))/2$$ Eq. (13)

where Amp and amp may represent amplitude; F may represent frequency; and pha may represent phase.

Figure 7A:
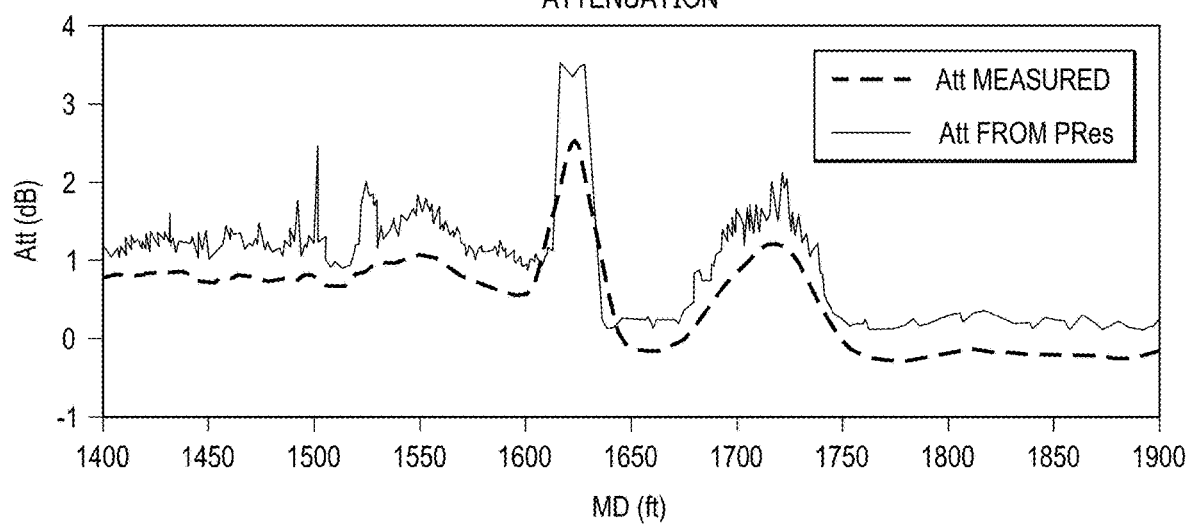
FIGS. 7A-9B illustrate graphs for obtaining in-situ calibration factors with ratio signals, in accordance with examples of the present disclosure.
Figure 7B:
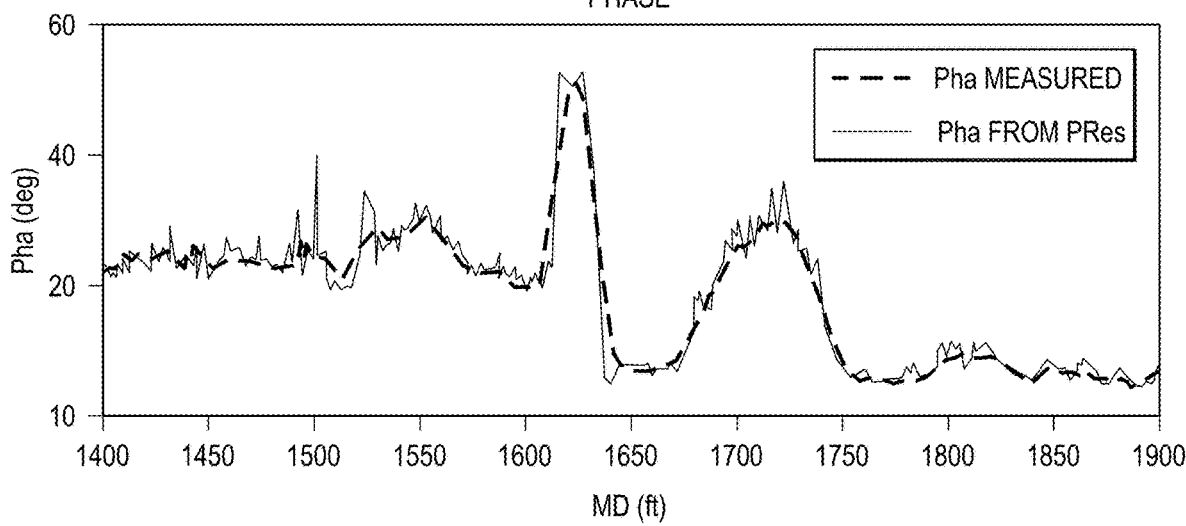
Figure 8A:
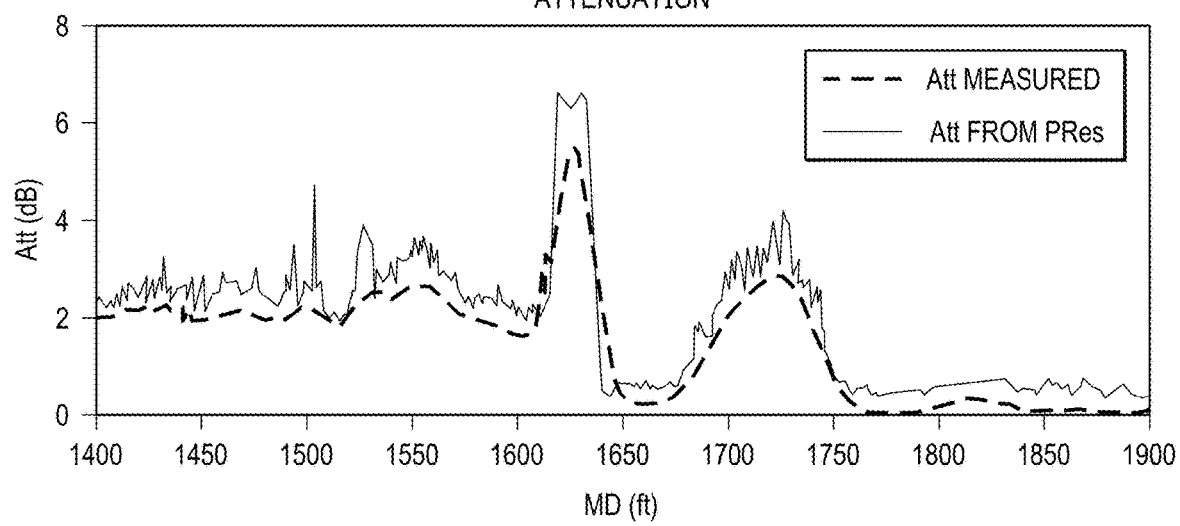
Figure 8B:
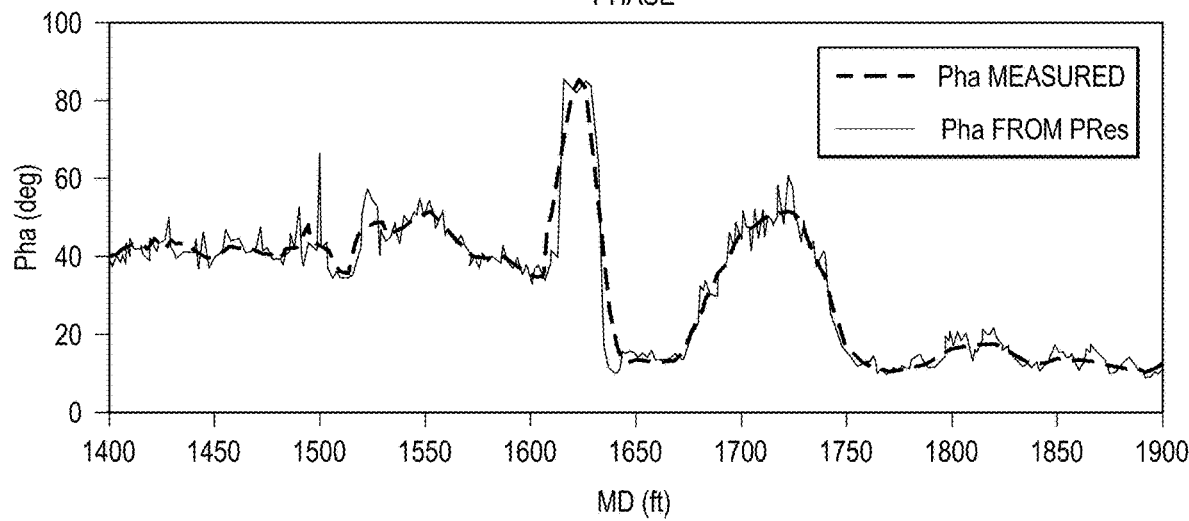
Figure 9A:
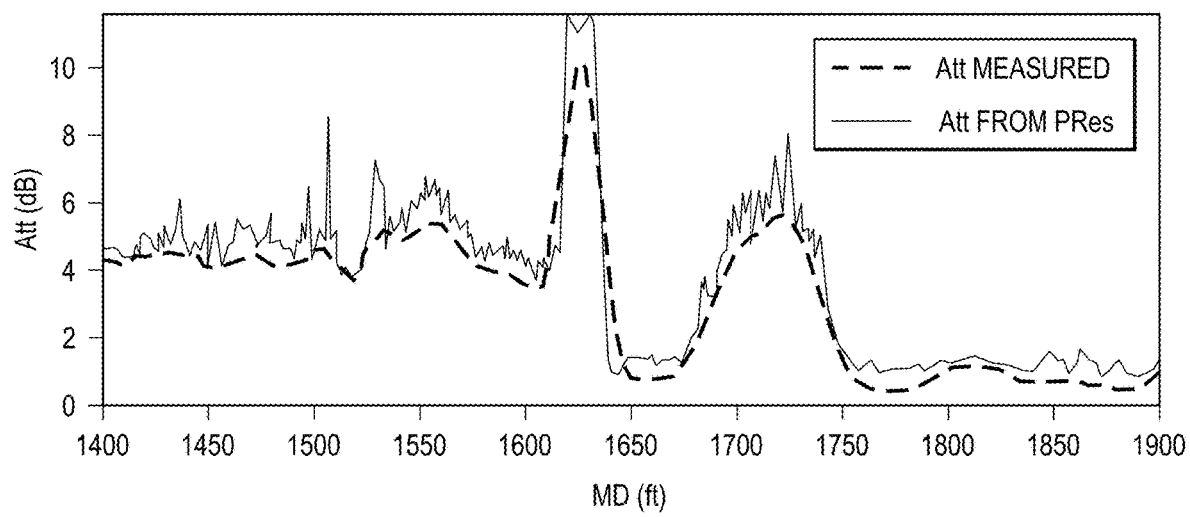
Figure 9B:
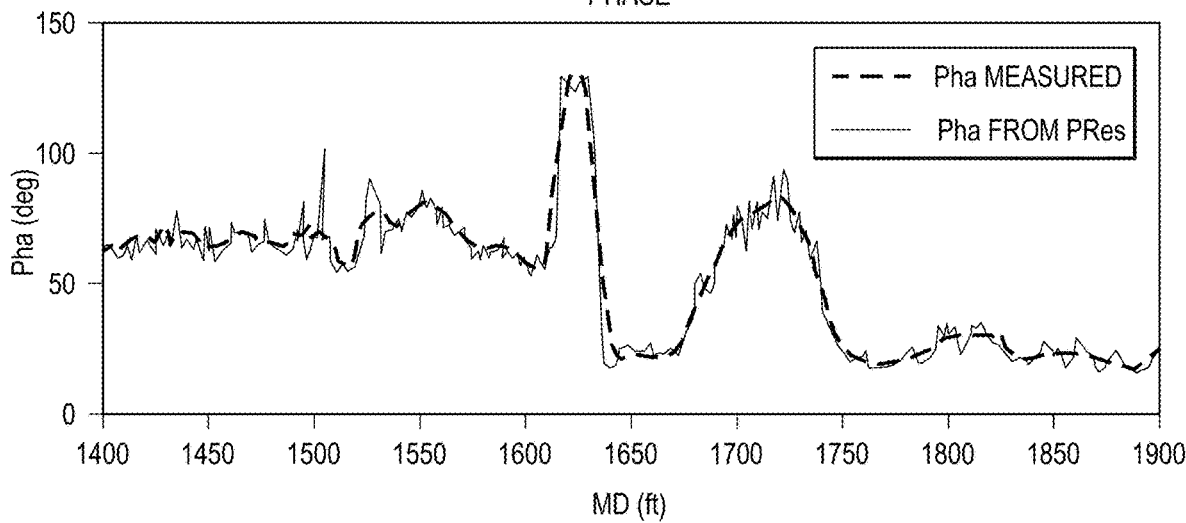

FIGS. 7A-9B illustrate graphs for obtaining in-situ calibration factors with ratio signals, in accordance with examples of the present disclosure. FIGS. 7A and 7B correspond to a first frequency. FIGS. 8A and 8B correspond to a second frequency. FIGS. 9A and 9B correspond to a third frequency. The apparent resistivity $R_a$ may be obtained following the step 604. The $R_a$ is indicated as 'PRes.' With the PRes, simulation of the dipole response ($[Z_{R1}']$) may occur and may be plotted as 'Att from PRes' and 'Pha from PRes.' The 'Att Measured' curves and 'Pha Measured' curves may indicate tensors directly decoupled from measurement $[Z_{R1}]$. From the curves, the in-situ calibration factor(s) may be determined and may be applied to $[Z_{R1}]$. The in-situ calibration factor may be determined by a sliding window with a depth length L, or other partitions with conditions in the step 606 of FIG. 6.

Figure 10A:
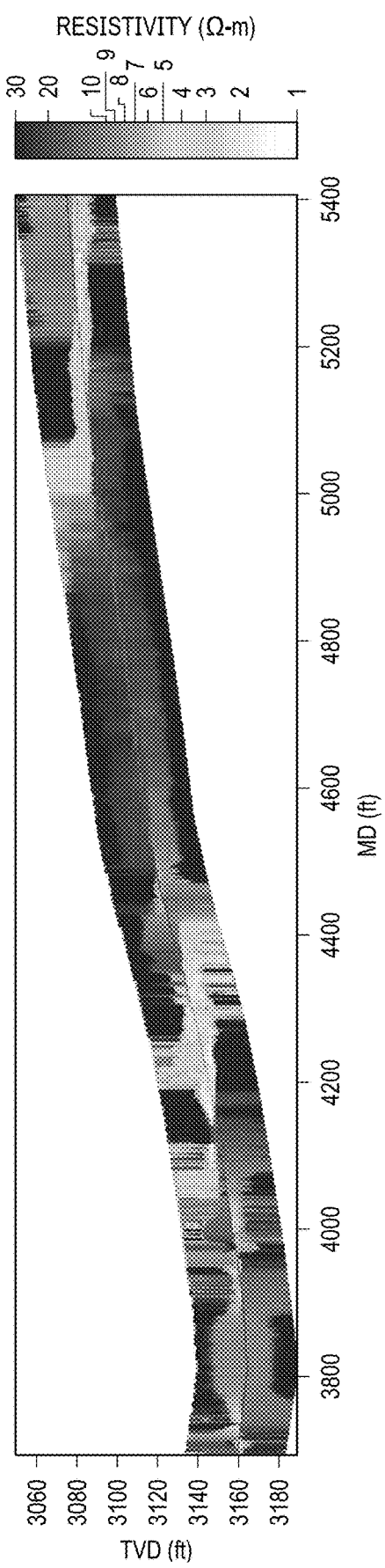
FIG. 10A illustrates inversion results without in-situ calibration, in accordance with examples of the present disclosure.
Figure 10B:
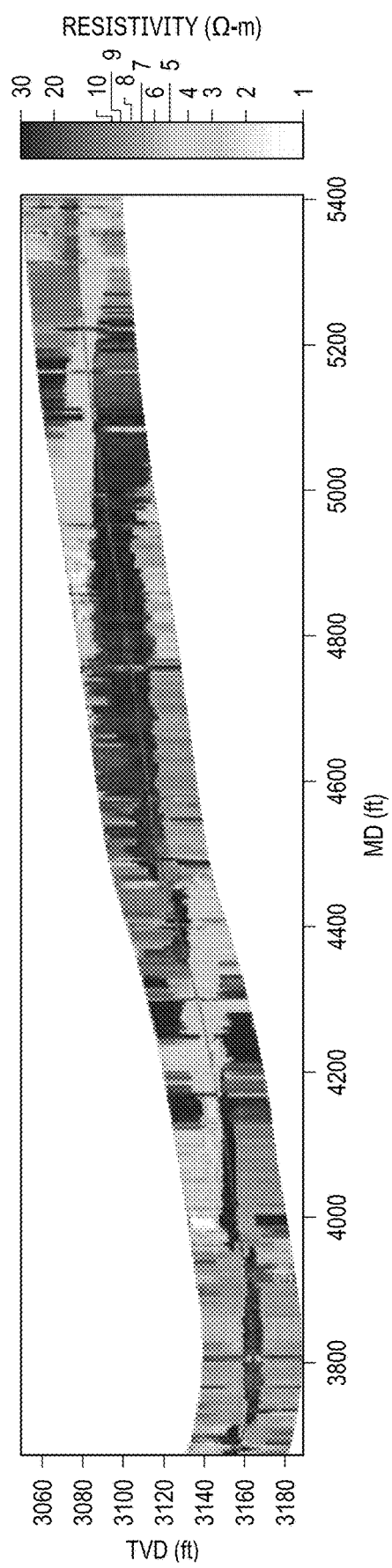
FIG. 10B illustrates the inversion results with in-situ calibration, in accordance with examples of the present disclosure.

FIG. 10A illustrates inversion results without in-situ calibration and FIG. 10B illustrates the inversion results with in-situ calibration, in accordance with examples of the present disclosure. As illustrated, the calibration is based on the region (e.g., measured depth) between 1800 feet and 1900 feet, and may be applied to all depths to test inversion results. FIG. 10B illustrates that the results with in-situ calibration show a more accurate formation resistivity.

Accordingly, the systems and methods of the present disclosure allow for accurate and cost-effective in-situ calibration of an electromagnetic resistivity tool. As described herein, the in-situ calibration techniques may remove the residual errors in multi-components tensors after air-hang calibrations, to improve signal quality input to an inversion module, thereby enhancing the answer product. In some examples, the techniques may be implemented in real-time and may be applied to different tools, formations, and drilling conditions. Implementation of the techniques does not require a change in hardware and may only require minimal changes in software.

The systems and methods may include any of the various features disclosed herein, including one or more of the following statements.

Statement 1. A method for in-situ calibration of a resistivity logging tool, comprises transmitting signals with transmitters of the resistivity logging tool; measuring voltages at two or more receivers located at different distances to the transmitters of the resistivity logging tool; decoupling two or more sets of multi-component tensors at two or more receivers based on the measured voltages; calculating a ratio signal from two or more sets of multi-component tensors; obtaining an apparent resistivity based on the ratio signal; simulating a dipole response tensor at the first receiver based on the apparent resistivity; comparing the first set of multi-component tensors with the dipole response tensor to acquire an in-situ calibration factor; and applying the in-situ calibration factor to multi-components for an inversion input.

Statement 2. The method of the statement 1, wherein the transmitting the signals with the transmitters of the resistivity logging tool comprises transmitting the signals with two collocated transmitters or a coaxial transmitter.

Statement 3. The method of the statement 1 or the statement 2, further comprising determining a trigger condition for the in-situ calibration.

Statement 4. The method of any one of the statements 1-3, wherein the determining the trigger condition for the in-situ calibration comprises determining a distance from the last calibrated measured depth.

Statement 5. The method of any one of the statements 1-4, wherein the determining the trigger condition for the in-situ calibration comprises determining a change in the apparent resistivity.

Statement 6. The method of any one of the statements 1-5, wherein the determining the trigger condition for the in-situ calibration comprises determining a change in temperature.

Statement 7. The method of any one of the statements 1-6, further comprising acquiring an in-situ calibration factor in a sliding window with a number of logging points.

Statement 8. The method of any one of the statements 1-7, wherein the transmitting signals comprises transmitting the signals with collocated transmitters or a coaxial transmitter of the resistivity logging tool.

Statement 9. The method of any one of the statements 1-8, wherein the measuring the voltages at the receivers comprises measuring the voltages at two or more receivers.

Statement 10. The method of any one of the statements 1-9, further comprising disposing the resistivity logging tool in a subterranean formation to acquire the in-situ calibration factor.

Statement 11. The method of any one of the statements 1-10, further comprising acquiring the in-situ calibration factor in real time during a drilling process.

Statement 12. A system for in-situ calibration of a resistivity logging tool, the system comprising: the resistivity logging tool comprising transmitters and receivers, the receivers operable to receive signals from the transmitters; and a computer operable to: receive voltage measurements from the receivers; decouple two or more sets of multi-component tensors based on the measured voltages; calculate a ratio signal from two or more sets of multi-component tensors; obtain an apparent resistivity based on the ratio signal; simulate a dipole response tensor based on the apparent resistivity; compare the first set of multi-component tensors with the dipole response tensor to acquire an in-situ calibration factor; and apply the in-situ calibration factor to multi-components for an inversion input.

Statement 13. The system of the statement 12, wherein the transmitters comprise collocated transmitters.

Statement 14. The system of the statement 12 or the statement 13, wherein the computer is further operable to determine a trigger condition for the in-situ calibration.

Statement 15. The system of any one of the statements 12-14, wherein the trigger condition comprises a distance from the last calibrated measured depth.

Statement 16. The system of any one of the statements 12-15, wherein the trigger condition comprises a change in the apparent resistivity.

Statement 17. The system of any one of the statements 12-16, wherein the trigger condition comprises a change in the temperature.

Statement 18. The system of any one of the statements 12-17, wherein the computer is further operable to slide a window for in-situ calibration of some logging points.

Statement 19. The system of any one of the statements 12-18, wherein the resistivity logging tool is disposed in a subterranean formation to acquire the in-situ calibration factor.

Statement 20. The system of any one of the statements 12-19, wherein the computer is further operable to acquire the in-situ calibration factor in real time during a drilling process.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:
1. A method for in-situ calibration of a resistivity logging tool, comprising:
   transmitting signals with transmitters of the resistivity logging tool;

measuring voltages at two or more receivers located at different distances to transmitters of the resistivity logging tool;

decoupling two or more sets of multi-component tensors at two or more receivers based on the measured voltages;

calculating a ratio signal from two or more sets of multi-component tensors;

obtaining an apparent resistivity based on the ratio signal;

simulating a dipole response tensor at the first receiver based on the apparent resistivity;

comparing the first set of multi-component tensors with the dipole response tensor to acquire an in-situ calibration factor; and applying the in-situ calibration factor to multi-components for an inversion input.

2. The method of claim 1, wherein the transmitting the signals with the transmitters of the resistivity logging tool comprises transmitting the signals with two collocated transmitters or a coaxial transmitter.

3. The method of claim 1, further comprising determining a trigger condition for the in-situ calibration.

4. The method of claim 3, wherein the determining the trigger condition for the in-situ calibration comprises determining a distance from the last calibrated measured depth.

5. The method of claim 3, wherein the determining the trigger condition for the in-situ calibration comprises determining a change in the apparent resistivity.

6. The method of claim 3, wherein the determining the trigger condition for the in-situ calibration comprises determining a change in temperature.

7. The method of claim 1, further comprising acquiring an in-situ calibration factor in a sliding window with a number of logging points.

8. The method of claim 1, wherein the transmitting signals comprises transmitting the signals with collocated transmitters or a coaxial transmitter of the resistivity logging tool.

9. The method of claim 1, wherein the measuring the voltages at the receivers comprises measuring the voltages at two or more receivers.

10. The method of claim 1 further comprising disposing the resistivity logging tool in a subterranean formation to acquire the in-situ calibration factor.

11. The method of claim 1, further comprising further comprising acquiring the in-situ calibration factor in real time during a drilling process.

12. A system for in-situ calibration of a resistivity logging tool, the system comprising:

the resistivity logging tool comprising transmitters and receivers, the receivers operable to receive signals from the transmitters; and a computer operable to:
receive voltage measurements from the receivers;
decouple two or more sets of multi-component tensors based on the measured voltages;
calculate a ratio signal from two or more sets of multi-component tensors;
obtain an apparent resistivity based on the ratio signal;
simulate a dipole response tensor based on the apparent resistivity;
compare the first set of multi-component tensors with the dipole response tensor to acquire an in-situ calibration factor; and
apply the in-situ calibration factor to multi-components for an inversion input.

13. The system of claim 12, wherein the transmitters comprise collocated transmitters.

14. The system of claim 12, wherein the computer is further operable to determine a trigger condition for the in-situ calibration.

15. The system of claim 14, wherein the trigger condition comprises a distance from the last calibrated measured depth.

16. The system of claim 14, wherein the trigger condition comprises a change in the apparent resistivity.

17. The system of claim 14, wherein the trigger condition comprises a change in the temperature.

18. The system of claim 12, wherein the computer is further operable to acquire an in-situ calibration factor in a sliding window with a number of logging points.

19. The system of claim 12, wherein the resistivity logging tool is disposed in a subterranean formation to acquire the in-situ calibration factor.

20. The system of claim 12, wherein the computer is further operable to acquire the in-situ calibration factor in real time during a drilling process.

* * * * *